March 28, 1933.  O. BAUR ET AL  1,903,162
SHAFT COUPLING
Filed Jan. 17, 1930  2 Sheets-Sheet 1
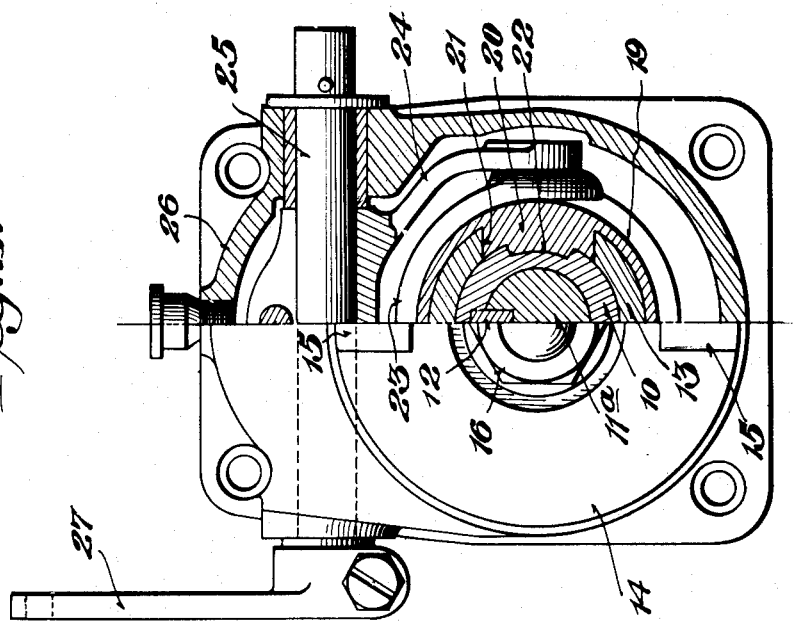
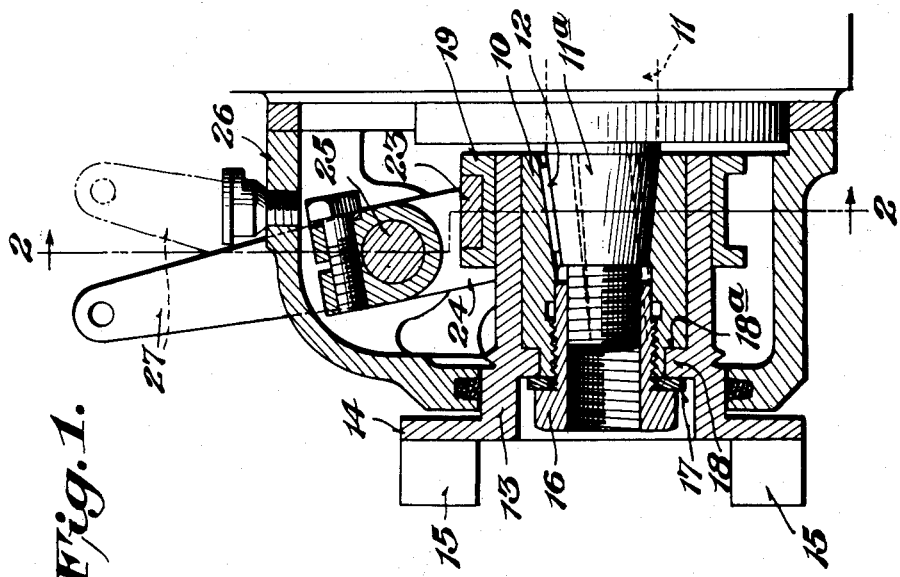
Inventors
Ottmar Baur & Hermann Lempp
By Steward & McKay
Attorneys March 28, 1933. O. BAUR ET AL 1,903,162
SHAFT COUPLING
Filed Jan. 17, 1930  2 Sheets-Sheet 2
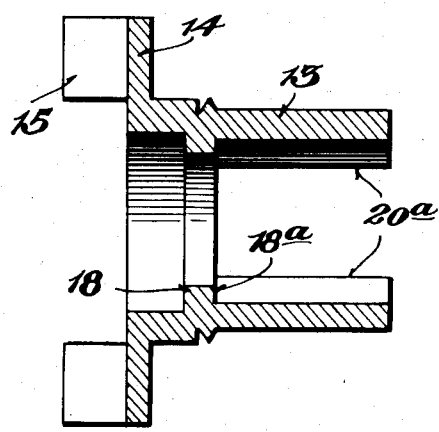
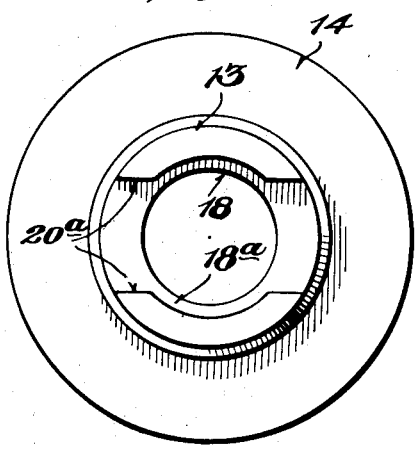
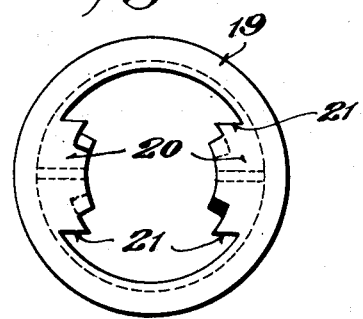
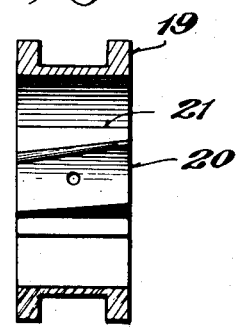
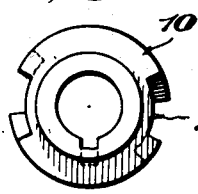
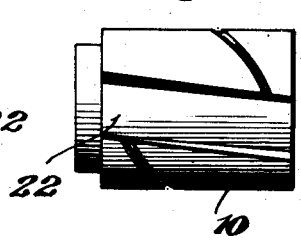
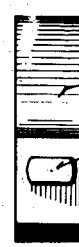
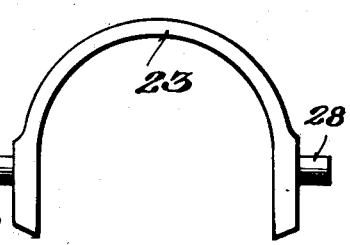
Inventors
Ottmar Baur & Hermann Lempf
By Steward & McKay
Attorneys Patented Mar. 28, 1933

1,903,162

UNITED STATES PATENT OFFICE

OTTMAR BAUR, OF STUTTGART, AND HERMANN LEMPP, OF FELLBACH, GERMANY, ASSIGNORS TO ROBERT BOSCH AKTIENGESELLSCHAFT, OF STUTTGART, GERMANY

SHAFT COUPLING

Application filed January 17, 1930. Serial No. 421,514.

This invention relates to shaft couplings designed to enable the angular relationship of the two parts coupled together to be varied about their axis while such parts are rotating.

The coupling embodying the present invention is particularly adapted for use in connecting the fuel pump of an engine of the Diesel type to the engine and accordingly this use of the invention will be described, although it is to be understood that the invention is not limited to this particular use.

In engines of the Diesel type it is desirable to vary the time of injection of the fuel with the engine speed so as to produce the same general results which are obtained in low compression engines by advancing or retarding the spark, but, as the fuel is injected at high pressure into the engine cylinders, considerable power is required to operate the fuel pump; therefore the coupling between the engine and the fuel pump must be very strong.

Oil pumps for Diesel engines are usually cam operated and in order to change the time of injection of the fuel it is necessary to change the angular relationship between the cam shaft and the driving mechanism therefor.

One of the principal objects of the present invention is to provide a coupling of the type just described which will not only permit the necessary adjustments to be made quickly and easily, but which can be readily installed as a complete unit and which will be simple, compact and rugged in construction.

Broadly speaking, this object may be attained by the use of a coupling member slidable axially with respect to driving and driven members, the sliding contact surfaces on the latter being angularly disposed to each other so that axial movement of the coupling member relatively to the other members produces a change in the angular relationship of the driving and driven members about their axes.

To obtain compactness, which is one of the objects of the invention, the driving, driven and coupling members may be conveniently arranged superimposed concentrically with respect to each other. With the same object in view the innermost member may be made hollow for the reception of one of the shafts to be connected by the coupling.

One form of construction which has been found very satisfactory comprises three superimposed concentrically arranged sleeves, the inside sleeve fitting over the end of the pump cam shaft, while the intermediate sleeve is connected by dogs to the pump driving mechanism. The outside sleeve is provided with projections extending through longitudinally arranged slots in the intermediate sleeve and slidably engaging recesses formed longitudinally in the periphery of the inside sleeve, the engaging surfaces of said slot and said recesses being angularly disposed to each other so that by axial movement of the outside sleeve relatively to the other sleeves the angular relationship between the latter may be varied, the engaging surfaces of the driving and driven members to be made relatively large in area or extent to withstand the strains or stresses to which these parts are subjected.

One desirable form of coupling is illustrated in the accompanying drawings wherein, Fig. 1 is a central vertical section through the coupling, Fig. 2 is in part (left side) an end view and in part (right side) a section on the line 2—2 of Fig. 1, Figs. 3 and 4 are cross-sectional and end views, respectively, of the intermediate sleeve.

Figs. 5 and 6 are end and cross sectional views, respectively of the outer sleeve, Figs. 7 and 8 are end and side views, respectively, of the inner sleeve, and, Figs. 9 and 10 are end and side views, respectively, of the yoke.

The coupling comprises a sleeve or bushing 10 having a conical inner surface at one end for engagement with the conical end portion 11a of the fuel pump cam shaft 11. A key 12 prevents relative rotation of the sleeve and shaft.

Rotatably mounted on the sleeve 10 is a second sleeve 13 having at its outer end a flange 14 on which are formed clutch dogs 15 for engagement with complementarily formed parts on the driving mechanism. The sleeve 13 is held in position on the sleeve 10 so that it cannot move axially with respect thereto by a hollow nut 16 screwed onto the extreme end of the shaft 11, the enlarged head of this nut engaging, through a suitable packing ring 17, one side of an inwardly extending flange 18 on the sleeve 13. The other side of this flange bears against a shoulder 18a on the sleeve 10. From the foregoing it will be seen that nut 16 also functions to hold sleeve 10 on shaft 11.

Axially slidable upon the sleeve 13 is a third sleeve 19 having two inwardly directed projections 20, passing through longitudinal slots 20a in the inner end of the sleeve 13 and having sliding engagement at 21 with the walls of these slots. These projections also extend into and have sliding engagement with the sides of longitudinal recesses 22 in the innermost sleeve 10. As shown, the sides of the slots 20a are parallel to the axis of the coupling while the sides of the recesses 22 are slightly helically disposed with respect to such axis. Consequently by moving the sleeve 19 axially the projections sliding along the slots 20a and recesses 22 produce a change in the relative angular positions of the sleeves 10 and 13 about their axes.

The position of the coupling sleeve 19 may be adjusted in any convenient way, such for example as a yoke 23 riding in a peripheral groove in the sleeve 19 and connected at its ends by lugs 28 to a fork 24 clamped onto a stub shaft 25, journalled in the casing 26. To one of the projecting ends of the shaft 25 is secured a control lever 27. In use the casing 26 is preferably secured directly to the casing of the fuel pump (not shown).

It will be observed from the foregoing that a very simple, compact construction has been provided which can be easily and quickly installed as a self-contained unit and that because of the extensive engaging surfaces of the connecting members the coupling will be able to withstand the heavy strains and stresses to which it is subjected without breakage.

It is to be understood that the invention is not limited to the exact arrangements shown and described and that various modifications can be made without departing from the spirit and scope of the broad invention as defined in the claims.

What is claimed is:

1. A coupling comprising two members one rotatably but non-slidably mounted on the other, a shaft, a single screw element for releasably connecting both of said members to said shaft, a third member slidably mounted on the outer of the first two members and formed with inwardly extending projections passing through slots having sides parallel to the axis of the coupling formed in said outer member and engaging helically disposed recesses in the inner of the first two members and means for moving said third member axially with respect to the first two members to vary the angular relationship between the latter.

2. A coupling comprising three superimposed concentrically arranged sleeves, the outside sleeve having a projection extending through a longitudinally arranged slot in the intermediate sleeve and slidably engaging a longitudinal recess formed in the periphery of the inside sleeve, the engaging surfaces of said slot and said recess being angularly disposed to each other so that by axial movement of the outside sleeve relatively to the other sleeves the angular relationship between the latter may be varied, an inwardly extending flange on said intermediate sleeve engaging a shoulder on the inside sleeve, a shaft, a single screw element for securing said inside sleeve to said shaft and for simultaneously engaging the opposite side of said flange to prevent relative axial movement between said inside and intermediate sleeves.

3. In a coupling device, a shaft, a bushing mounted on the end of said shaft, a sleeve rotatably mounted on said bushing, and a single means for simultaneously securing said bushing to said shaft and rotatably securing said sleeve to said bushing.

4. In a coupling device, a shaft, a bushing mounted on the end of said shaft, a sleeve rotatably mounted on said bushing and having an inwardly extending flange engaging a shoulder on said bushing, and means for simultaneously securing said bushing to said shaft and engaging the opposite face of said flange to prevent axial movement of the sleeve with respect to said bushing.

5. In a coupling device, a shaft having a conical end, a bushing having a conical bore mounted on the end of said shaft, a sleeve rotatably mounted on said bushing and having an inwardly extending flange engaging a shoulder on said bushing, a screw element having threaded engagement with the end of said shaft and having a head engaging and securing said bushing upon said shaft, the head of said screw elements simultaneously serving as a counter shoulder for said inwardly extending flange to prevent axial movement of said sleeve with respect to said bushing.

In testimony whereof we have hereunto affixed our signatures.
OTTMAR BAUR.
HERMANN LEMPP.